(12) United States Patent
Pappas (10) Patent No.: US 11,994,249 B2
(45) Date of Patent: May 28, 2024

(54) PIPE SHIELDS AND METHODS OF SHIELDING A PIPE

(71) Applicant: Andrea Pappas, New York, NY (US)

(72) Inventor: Andrea Pappas, New York, NY (US)

( * ) Notice: Subject to any disclaimer, the term of this patent is extended or adjusted under 35 U.S.C. 154(b) by 0 days.

(21) Appl. No.: 18/189,510

(22) Filed: Mar. 24, 2023

(65) Prior Publication Data

US 2023/0304625 A1    Sep. 28, 2023

Related U.S. Application Data

(60) Provisional application No. 63/323,262, filed on Mar. 24, 2022.

(51) Int. Cl.
*F16L 59/02* (2006.01)

(52) U.S. Cl.
CPC .......... *F16L 59/022* (2013.01); *F16L 59/028* (2013.01)

(58) Field of Classification Search
CPC .............................. F16L 59/022; F16L 59/028
See application file for complete search history.

(56) References Cited

U.S. PATENT DOCUMENTS

| | | | |
|---|---|---|---|
| 1,227,087 A | 5/1917 | Steffens | |
| 1,352,947 A * | 9/1920 | Fiske | H01F 7/206 212/327 |
| 4,929,897 A * | 5/1990 | Van Der Walt | G01B 7/281 324/240 |
| 5,036,277 A * | 7/1991 | van der Walt | G01B 7/281 324/240 |
| 7,159,620 B2 | 1/2007 | Kissell | |
| 8,658,264 B2 | 2/2014 | Cao | |
| 10,197,210 B2 | 2/2019 | Hoffman | |
| 2015/0079316 A1 | 3/2015 | Pernell | |
| 2019/0302301 A1 * | 10/2019 | Fyffe | G01V 1/3852 |
| 2021/0162256 A1 * | 6/2021 | Anani | A63B 24/0087 |

OTHER PUBLICATIONS

RENOV8OR. "Rope-wrapped exposed steam pipe—four years later". Oct. 12, 2019. <URL: https://renov8or.blogspot.com/2019/10/rope-wrap-exposed-steam-pipe.html>.

Shalwan, A. et al. "Insulation Characteristics of Sisal Fibre/Epoxy Composites." International Journal of Polymer Science. Dec. 25, 2017 <URL: https://doi.org/10.1155/2017/7312609>.

* cited by examiner

*Primary Examiner* — Rick K Chang
(74) *Attorney, Agent, or Firm* — Nemphos Braue LLC; Michael Antone (57) ABSTRACT

A conduit thermal shield that may include a section of shielding material having opposing ends connected by a connector. The shielding material is configured to wrap around a pipe with the opposing ends connecting via the connector. In various embodiments, the shielding material may be sections of a roped material, such as sisal rope, and the connectors may include one or more cooperating magnets disposed at or near opposing ends of the shielding material and the connectors may be adjustable.

11 Claims, 9 Drawing Sheets

PIPE SHIELDS AND METHODS OF SHIELDING A PIPE

CROSS-REFERENCE TO RELATED APPLICATIONS

This application claims priority to and the benefit of U.S. Provisional Patent Application No. 63/323,262 filed on 2022 Mar. 24, the disclosure of which being incorporated by reference in its entireties.

STATEMENT REGARDING FEDERALLY SPONSORED RESEARCH OR DEVELOPMENT

Not Applicable

BACKGROUND OF THE INVENTION

Field of the Invention

The present invention generally relates to thermal shielding. More specifically, the invention relates to thermal shielding for use with hot and cold conduits to prevent injuries, and particularly for steam risers and other hot or cold pipes located in areas where the pipe may be inadvertently contacted by people.

Background

The presence of steam risers and other hot pipes, or more generally speaking conduits, in residential, commercial, and industrial buildings in many cases is a necessity. For example, many residential and commercial buildings employ steam and/or hot water heat during cold weather. Industrial facilities often require very hot and very cold fluids to be transported through the facility for various purposes. While some pipes carrying hot and cold fluids may have some amount of insulation or other covering to protect the piping from damage and environmental heat or cooling, the coverings may not be sufficient to protect people from burn injuries if the pipes are contacted, particularly in applications where the pipes are being used to heat or cool an area, so heat transfer is essential.

In residential and commercial settings, shielding options include foam or fiberglass tubes and wraps, which are generally unattractive and drastically cheapen the aesthetics of any home dwelling or public environment. In addition, most foam pipe insulator products are not designed for hot pipes and may degrade and outgas when used on hot pipes, such as steam risers. Similarly, fiberglass insulation can easily tear exposing the fiberglass, which is a respiratory and skin irritant.

Another option is to wrap rope or other material around the pipe. However, wrapping material, such as rope, around a pipe from floor to ceiling often requires tens of feet of rope or other wrapping material and is an arduous and time-consuming process, particularly since steam risers and other pipes are often located in corners and run along walls. In addition, the installation is most safely performed only when the pipe is not in use by the system to avoid being burned during the installation. Furthermore, given the length of material involved it is highly likely that the material may not achieve the desired aesthetic appearance, particularly over time as the material sags and ages.

As such, there is a continuing need for pipe thermal shielding that provides higher performance and more aesthetic appeal. This need is particularly acute in buildings employing steam and hot water heating.

BRIEF SUMMARY OF THE INVENTION

The present invention addresses the above noted needs by providing aesthetically pleasing conduit thermal shielding that may be efficiently installed and removed in various lengths to protect people from injuries.

In various embodiments, the thermal pipe shield may include a section of shielding material having opposing ends connected by a connector. The shielding material is configured to wrap around the pipe with the opposing ends connecting via the connector. In this manner, the shield may be installed in locations of choice and removed as desired by the user without contacting the pipe or having to wrap extended lengths of shielding material around the pipes. When installed near walls, the shield may be configured, so the connector is not visible, which typically improves the aesthetic value of the shield.

The shielding material may be selected for specific applications considering the temperature of the pipe to be shielded and the aesthetics of the location. For example, the shielding material may be sections of sisal and other ropes, non-roped fabric, and other materials that may be conformed to the shape of a pipe and provide a desired level of thermal shielding. In addition, the exterior surface of the shielding material may be decorated in a manner desired by the user.

Similarly, the connector may be selected for specific applications considering the temperature of the pipe to be shielded and the aesthetics of the location. For example, in a steam riser application, the connector may include magnets, which may be embedded in the shielding material, or supported by a connector structure, e.g., cap, provided on the opposing ends of the shielding material, such that the shielding material is retained by the structure and held in a closed position by the magnetic field. In other embodiments, the connector may include a mechanical connection that may be permanently or removably installed.

In addition to the connector connecting the opposing ends of the shielding material, the connector may also include a capability to connect the pipe shield to adjacent sections of the pipe shield. The connection to adjacent sections may allow the various sections of the pipe shield to be handled as one section.

In application, the user of the pipe shield will begin the installation with the connector disconnected and will wrap the pipe shield around the pipe until the connector is connected and then, if needed, rotate the pipe shield around the connector until it is in the desired position. The user may install additional sections until the pipe section of interest is fully shielded.

Accordingly, the present disclosure addresses the continuing need for pipe shielding with improved performance and appearance.

BRIEF DESCRIPTION OF THE DRAWINGS

The accompanying drawings are included for the purpose of exemplary illustration of various aspects of the present invention, and not for purposes of limiting the invention, wherein.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Conduit or pipe shields 10 of the present invention address the above noted needs by providing aesthetically pleasing pipe thermal shielding that may be efficiently installed and removed in various lengths to protect people from burn injuries. While the present invention may be described with reference to pipes, it will be appreciated that the invention is not limited to conduits with circular geometries, but is applicable to conduits with other geometries, such as ductwork, etc.

Figure 1A:
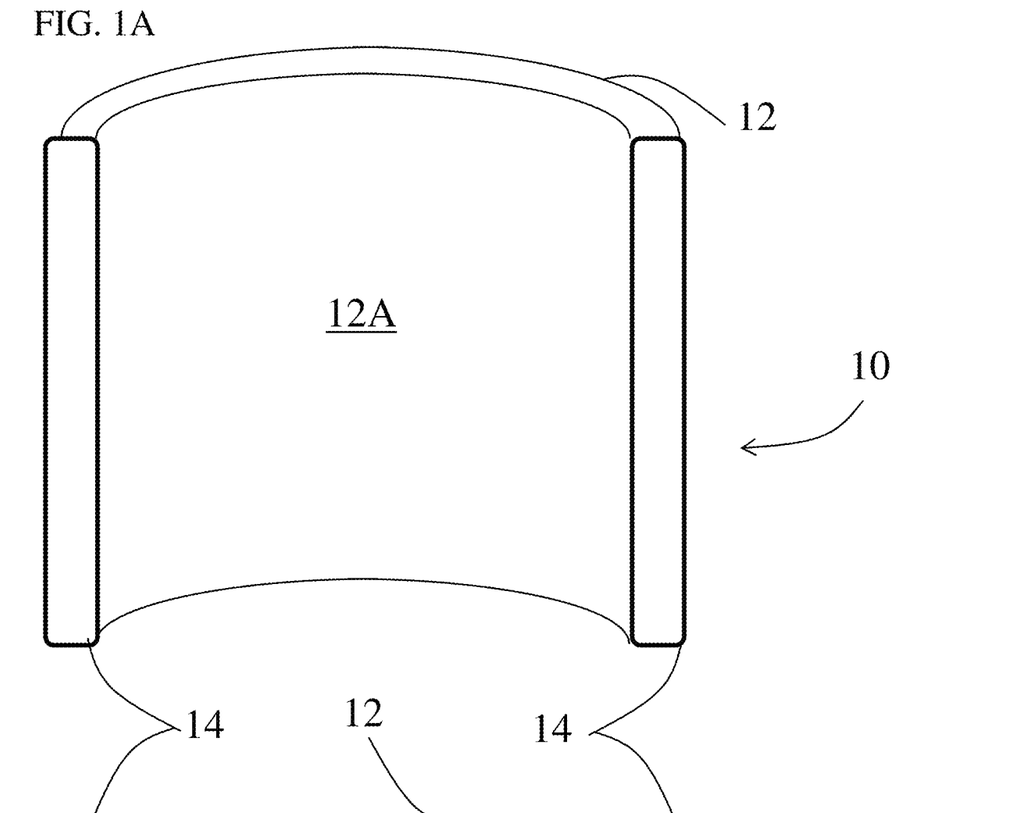
FIGS. 1A & 1B depict perspective and side views of exemplary pipe shield embodiments with connectors on opposing ends.
Figure 1B:
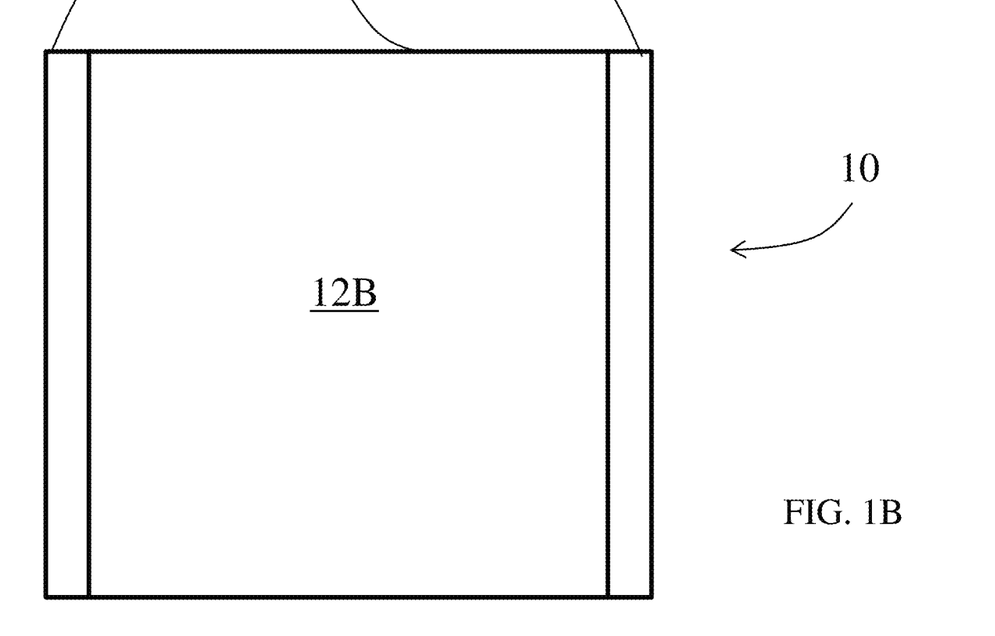

FIGS. 1A & 1B depict perspective and side views of exemplary pipe shields 10 including a section of shielding material 12 having opposing ends that may be connected by a connector 14 provided on both of the opposing ends. FIGS. 1A & 1B show the shield 10 in the unconnected position, which may be wrapped around a pipe and the opposing ends connected via the connector 14. FIG. 1A depicts a perspective view of an interior surface 12A of the shielding material 12. FIG. 1B depicts a side view of an exterior surface 12B of the shielding material 12. It will be appreciated that the opposing ends of the shielding material 12 may or may not correspond to the ends of the shielding material, but to the locations where the connector 14 is provided.

The shielding material 12 may be selected for specific applications considering the temperature of the pipe to be shielded, the desired temperature of the shielding material 12 surface facing the user and the aesthetics of the location. For example, the shielding material 12 may be sections of sisal and other ropes, non-roped fabric, and other materials that may conform or be bent to conform to the shape of a pipe 30 and provide a desired level of thermal shielding, such as bending pliable materials, mechanically hinging less pliable materials, combining different materials of differing pliability, etc. In practice, a range of suitable materials having insulating properties over a range of R-value may be employed by the skilled artisan. In addition, the shielding material 12 may be decorated in a manner desired by the user.

Figure 2A:
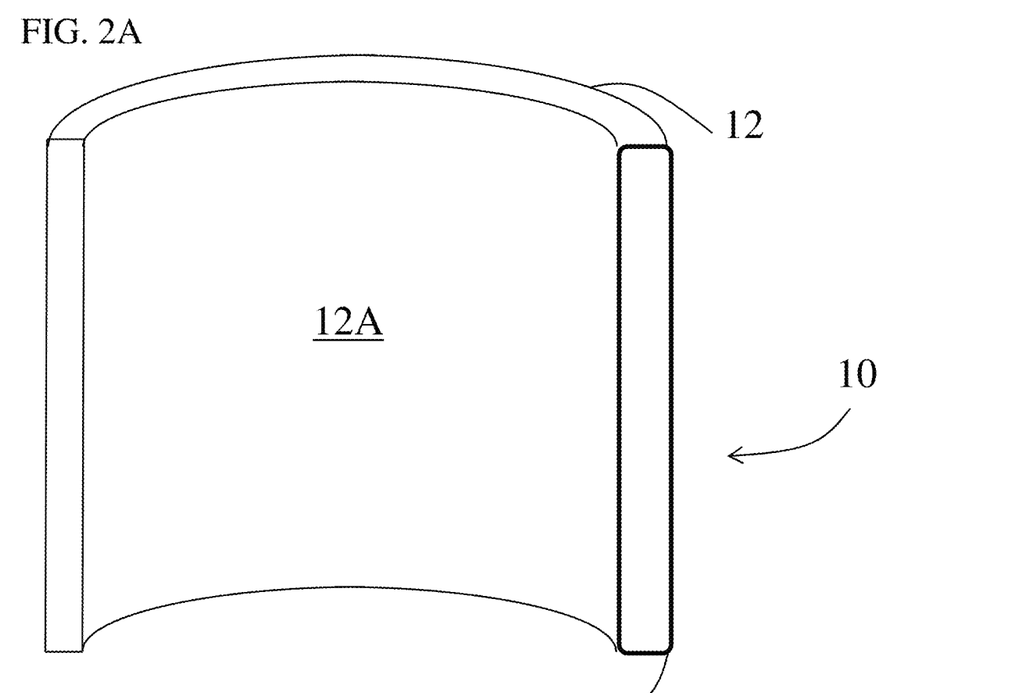
FIGS. 2A & 2B depict perspective and side views of exemplary pipe shield embodiments with a connector on one of the opposing ends.
Figure 2B:
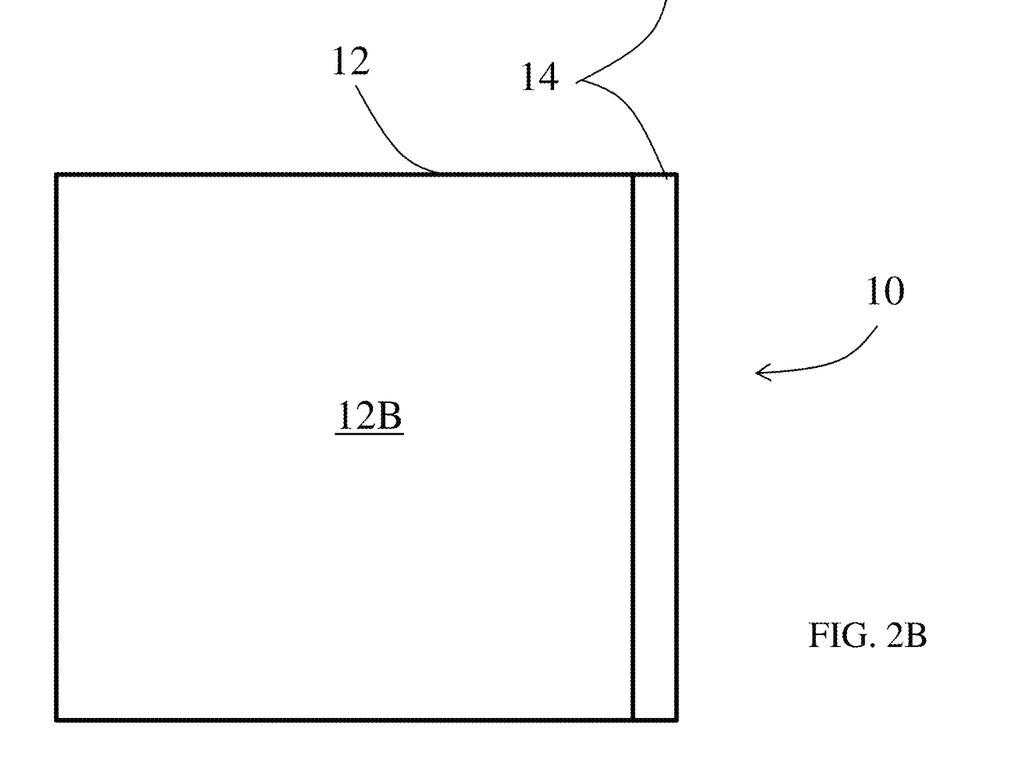

FIGS. 2A & 2B depict perspective and side views of exemplary pipe shields 10 in which the connector 14 is provided on one of the opposing ends of the shielding material 12. The opposing end that does not include the connector 14 may be captured by the connector 14 on the other opposing end, such as by permanent and removable clamps, teeth, etc.

Figure 3A:
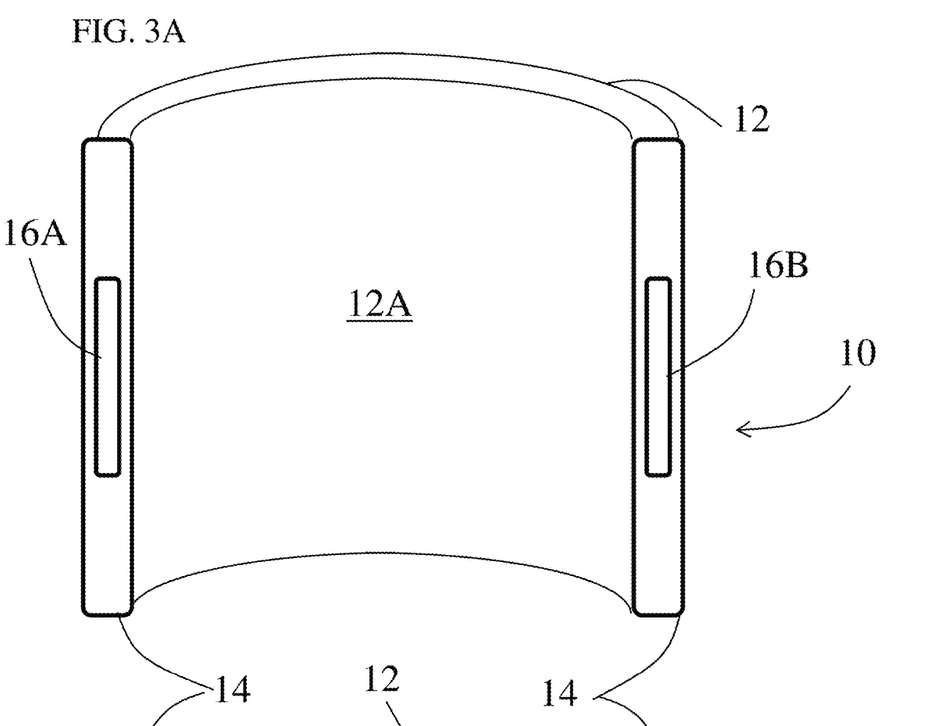
FIGS. 3A & 3B depict perspective and side views of exemplary pipe shield embodiments with connectors on opposing ends.
Figure 3B:
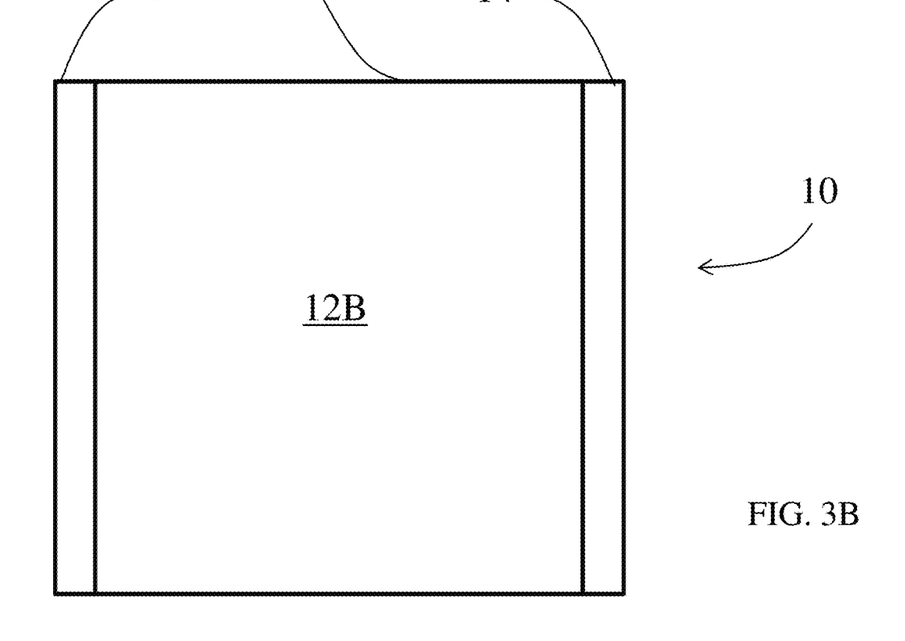

FIGS. 3A & 3B depict shield 10 embodiments, such as those shown in in FIGS. 1A & 1B, in which the connector 14 includes cooperating connector portions 16A and 16B attached to or embedded in the connector structure 14, such as a cap. The connector portions 16A and 16B may employ various connecting means and technologies, such as magnets, and cooperating, e.g., female/male type, connectors, such as snaps, buttons, screws, hooks & loops (e.g., Velcro™) buckles, etc.

The connector portions 16A and 16B and the connector structure 14 may be comprised of materials suitable to withstand the thermal conditions proximate a hot or cold pipe 30 depending upon the application. For example, the connectors 14 may be comprised of plastics, carbon fibers, etc., such as thermoplastic polyester resins based on polybutylene terephthalate (PBT) and/or polyethylene terephthalate (PET) polymers, e.g., VALOX™. Metals may be employed as material comprising the structure of the connector 14 to provide strength; however, the metals may need to be insulated properly given the conductive nature of metals and that the connectors 14 may be handled by the user.

The use of magnets as the connector 14 may be beneficial for various applications, such as steam riser applications, where the shield 10 may be held in place by the magnetic field and the connection may be made or broken without necessarily touching the connector.

In addition to the connector 14 connecting the opposing ends of the shielding material, the connector 14 may also include a capability to connect the pipe shield 10 to adjacent sections of the pipe shield 10. The connection to adjacent sections may allow the various sections of pipe shield 10 to be handled as one section. Alternatively, separate connectors may be provided for connecting the adjacent pipe shields 10.

Figure 4A:
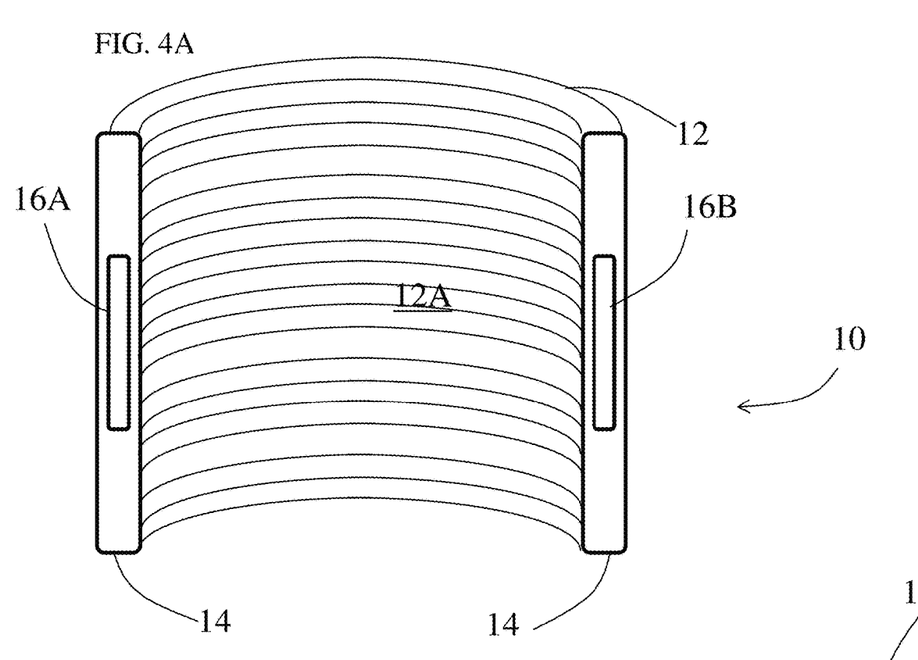
FIGS. 4A & 4B depict perspective and side views of exemplary pipe shield embodiments with exemplary connectors on opposing ends.
Figure 4B:
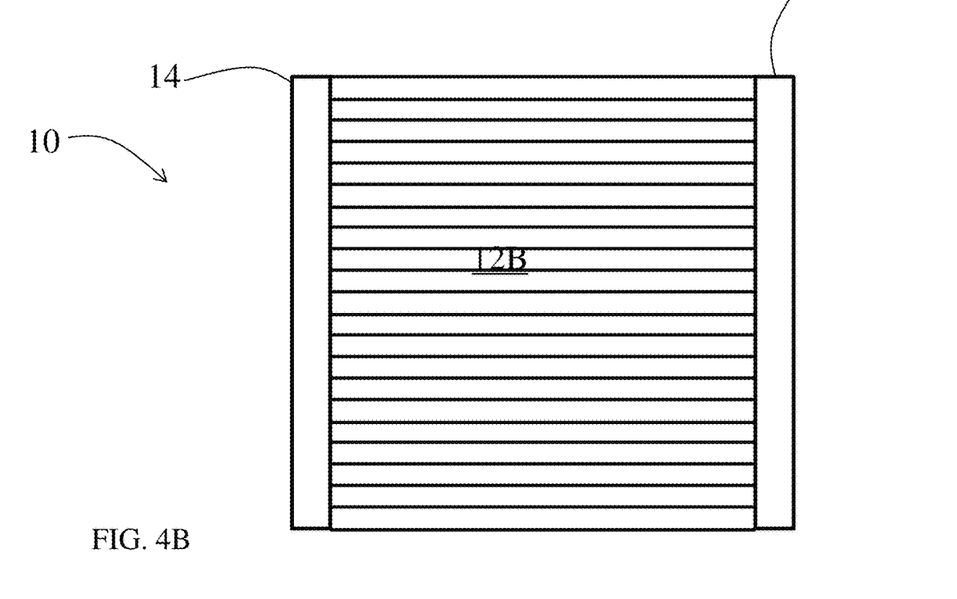

FIGS. 4A & 4B depict perspective and side views of exemplary pipe shield 10 embodiments with exemplary connectors 14 on opposing ends of the shielding material 12. These embodiments depict the use of sections of a roped material for the shielding material 12, such as sisal rope. In addition, the connector 14 is depicted as including cooperating portions 16A and 16B that may be embedded in or attached to the connector structure that connects to the shield material 12.

Figures 5A, 5B:
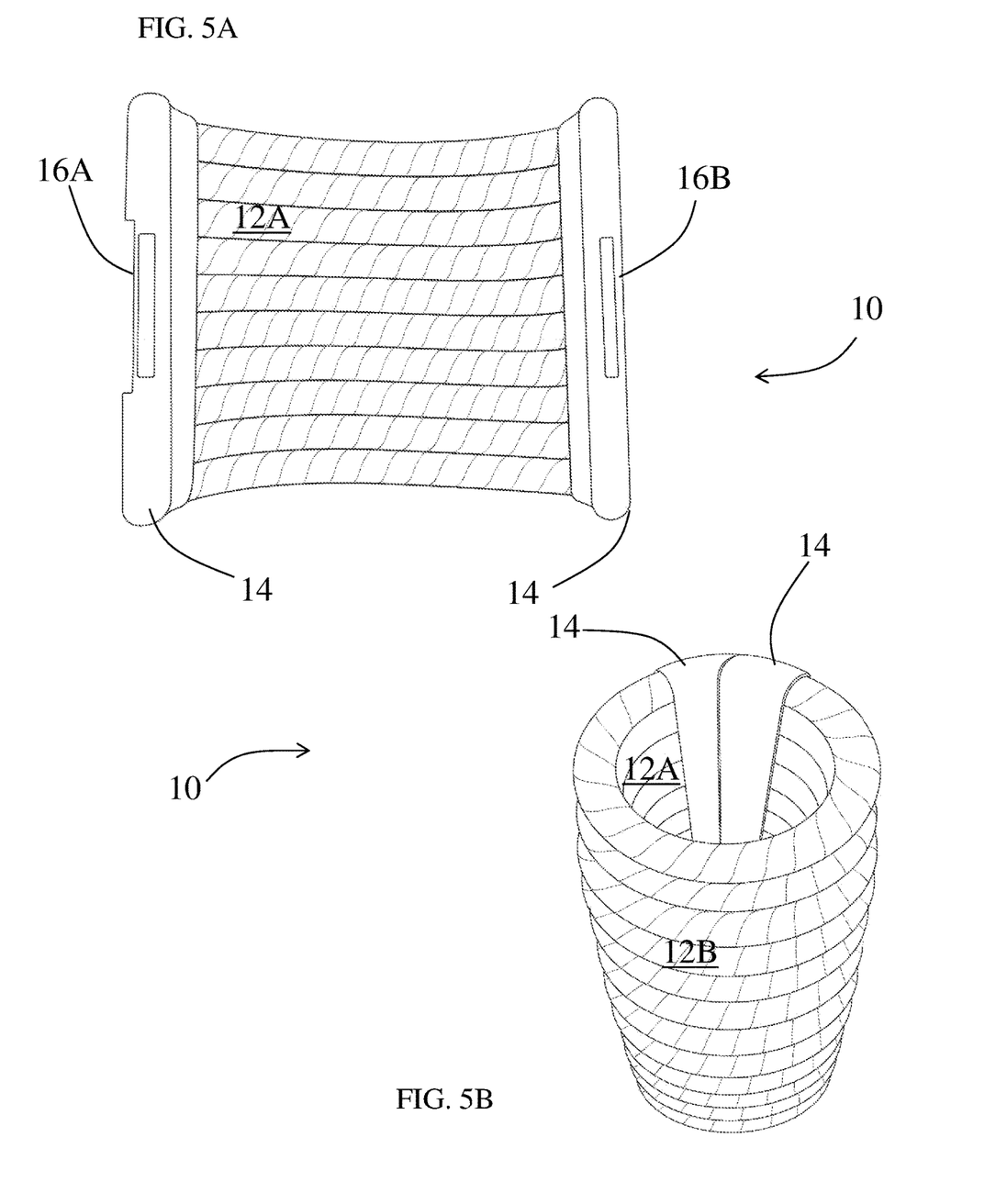
FIGS. 5A & 5B depict side and perspective views of exemplary pipe shield embodiments with sisal rope shielding material and exemplary magnet connectors on opposing ends.

FIGS. 5A & 5B depict side and perspective views of exemplary pipe shield 10 embodiments with sisal rope sections as the shielding material 12 and the connectors 14 that include magnets 16A & 16B attached to and/or embedded in a connector structure on opposing ends on the shielding material 12. FIG. 5A shows the pipe shield 10 in an open/unconnected position showing the connectors 14 including opposing magnets 16A & 16B. FIG. 5B shows the pipe shield 10 in a closed/connected position. As may be noted in FIGS. 5A & 5B, the connector 14 may be implemented with various geometries and textures for various functional and aesthetic purposes by the skill artisan. For example, the connectors 14 do not meet perpendicular to the perimeter of circular cross-section of the shield 10 in FIGS. 5A & 5B.

Figures 6A, 6B:
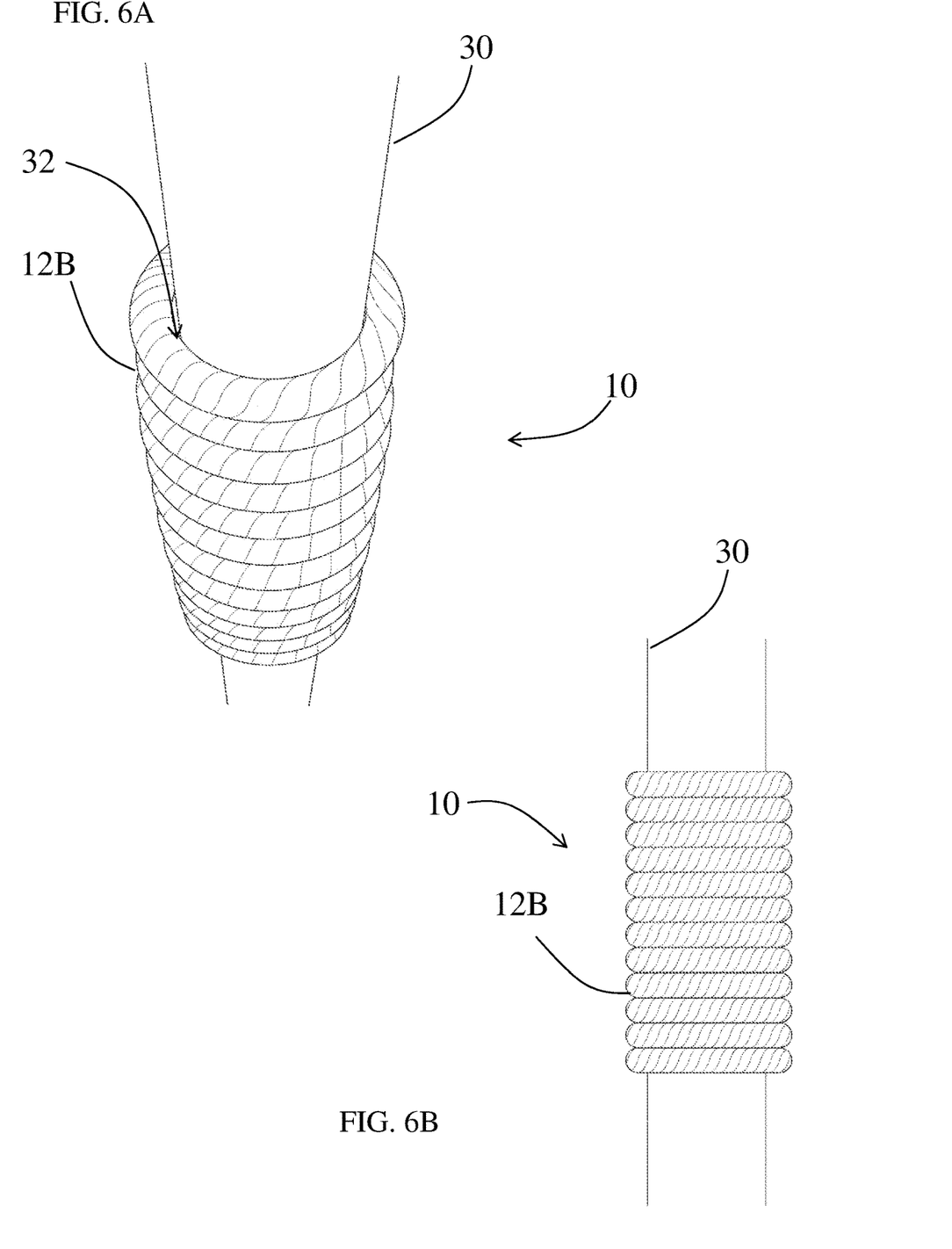
FIGS. 6A & 6B depict perspective and side views of exemplary pipe shield embodiments with sisal rope shielding material installed around a pipe.

FIGS. 6A & 6B depict perspective and side views of exemplary pipe shield 10 embodiments of FIGS. 5A & 5B installed on a pipe 30. In application, the installer/user of the pipe shield 10 will begin the installation with the connector 14 disconnected as shown in FIG. 5A and will wrap the pipe shield 10 around the pipe 30 until the connector 14 is connected and then, if needed, rotate the pipe shield 10 around the pipe 30 until connector 14 is in a desired position.

Figures 7A, 7B:
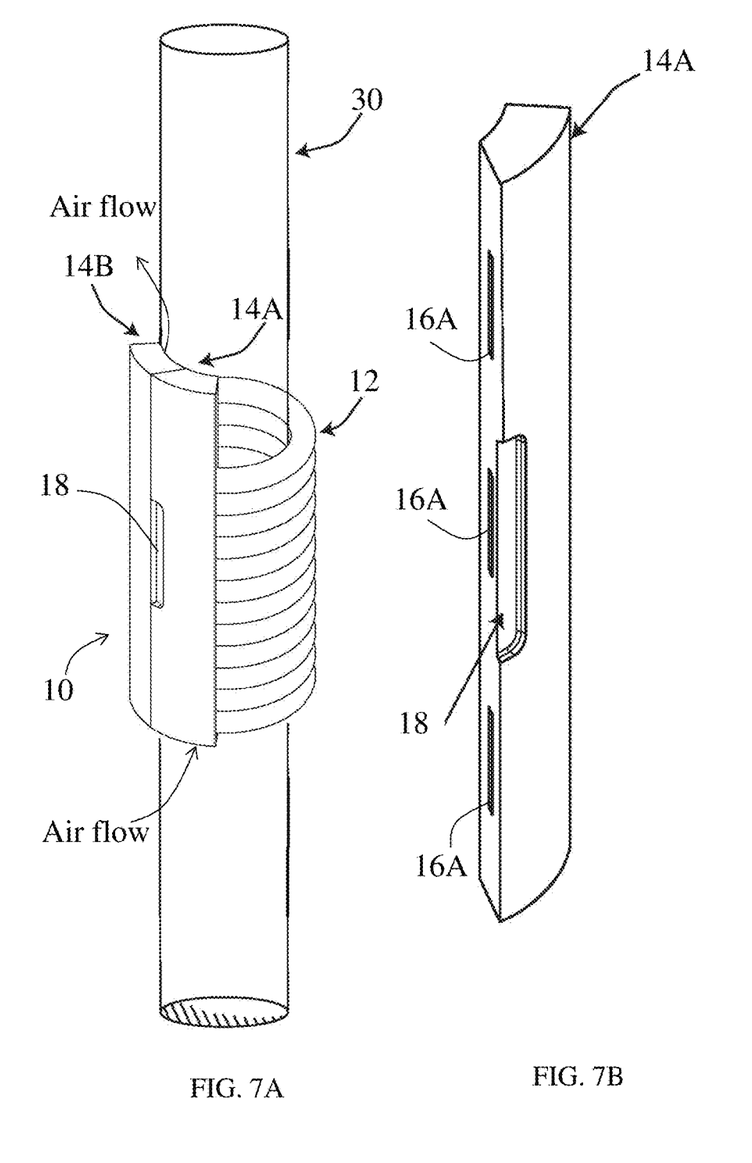
FIG. 7A depicts exemplary pipe shield embodiments with rope shielding material installed on a pipe with a two piece connector.
FIG. 7B-7H depict perspective and side views of exemplary connectors as may be used in pipe shield embodiments such as those in FIG. 7A.
Figure 7C:
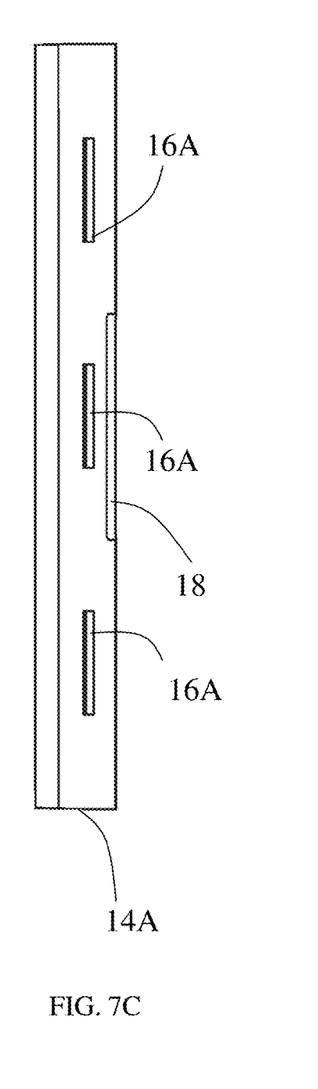
Figure 7D:
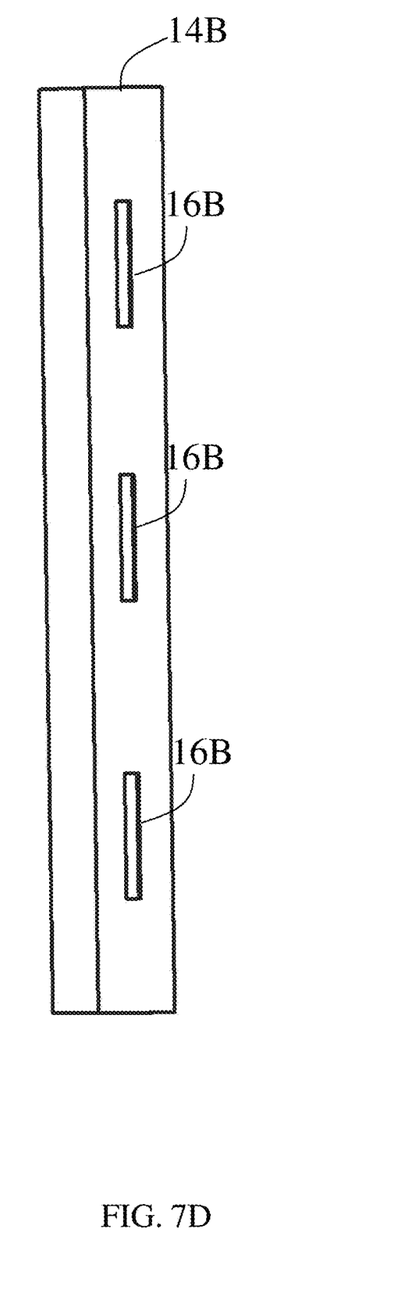
Figure 7E:
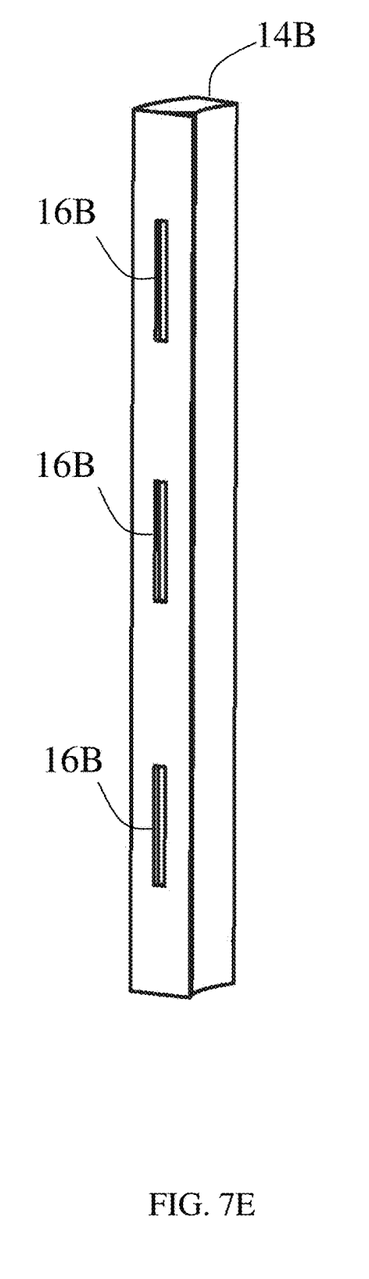
Figure 7F:
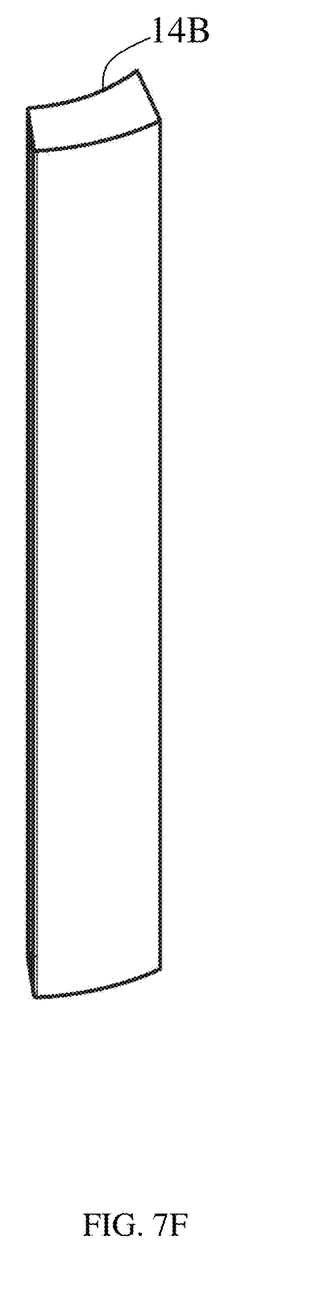

FIG. 7A depicts exemplary pipe shield 10 embodiments with rope shielding material 12 installed on the pipe 30 with a two-piece connector 14. FIGS. 7B-7H depict perspective and side views, respectively, of the exemplary connectors 14, such as those in FIG. 7A, having first and second cooperating parts, 14A & 14B. FIGS. 7B & 7C embodiments depict the first connector part 14A including a plurality of cooperating connectors 16A, such as magnets, and a recessed portion 18 or other means or mechanism for handling of the shield 10 by a user during installation or removal. FIGS. 7D-7F depict the second part of the connector 14B including a plurality of cooperating connectors 16B, such as magnets, that cooperate with the cooperating connectors 16A on the first connector part 14A. FIG. 7D depicts a side view of a surface of the second section of the connector part 14B including the cooperating connectors 16B, which also shows a portion of a surface on the interior of the connector part 14B that would face the pipe 30 in the installed position. FIG. 7E depicts a perspective view of the surface including the cooperating connectors 16B and the exterior surface of the connector part 14B. FIG. 7F depicts a perspective view of the exterior surface of the connector part 14B.

Figure 7G:
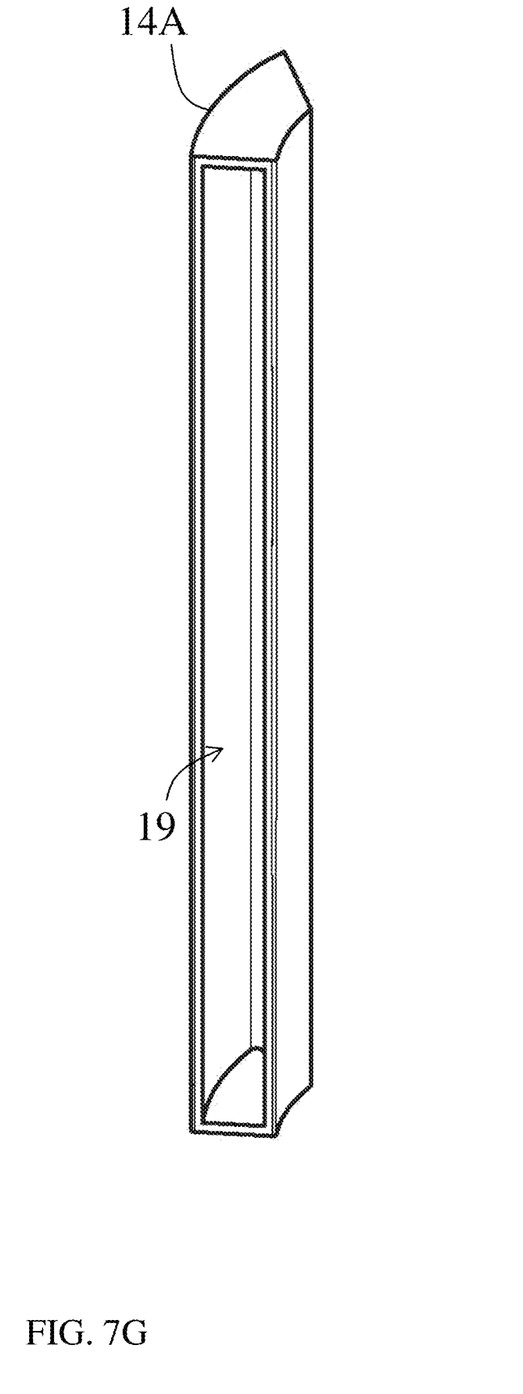
Figure 7H:
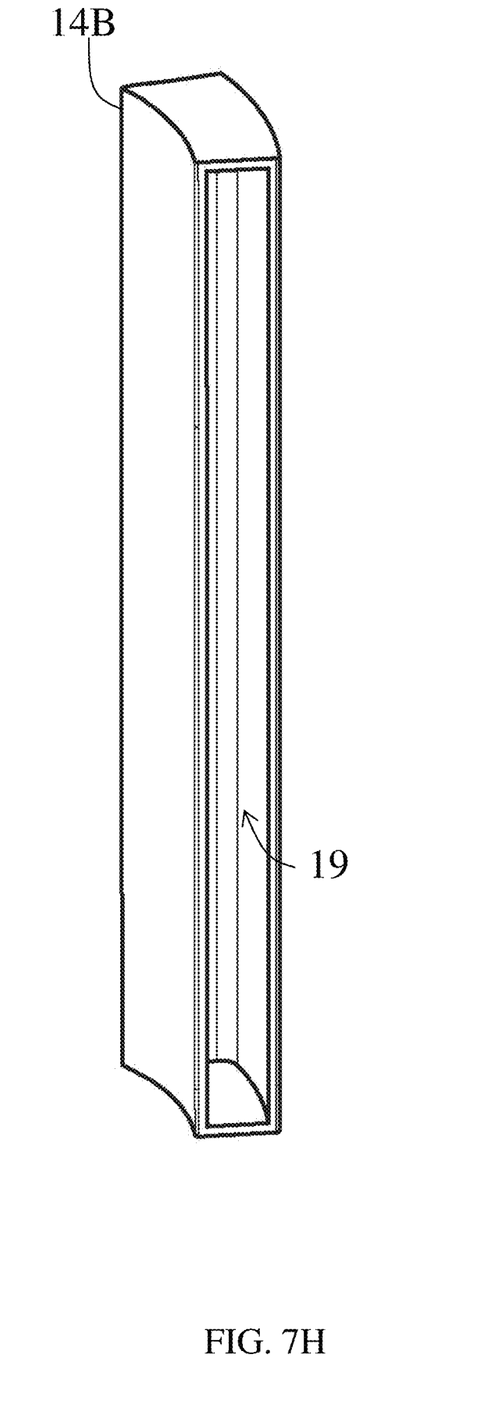

FIGS. 7G & 7H depict perspective views of the first and second connector parts 14A & 14B showing an opening 19 into which the shielding material 12 may be inserted and secured with the connector parts servings as an end cap. The shielding material 12 may be secured using a friction, e.g., a slip fit, and/or various fasteners, e.g., glues, screws, etc. as is known. As previously noted, the connector 14 may be formed on the shielding material 12, via molding or otherwise, and/or be part of the shielding material and the physical connection between the ends of the shielding material 12 may be provided by cooperating connectors 16A & 16B attached to or integrated with the shielding material 12 or by other means as may be known in the art.

In various embodiments, the pipe shield 10 may be installed with or without a defined annular gap 32 between the shield 10 and pipe 30, such as shown in FIG. 6A. For applications in which it is desired for the pipe shield to remain in place without support, a snug fit and no annular gap may be required. In addition, it may be desirable to texture the interior surface 12A, add a texture material and/or an adhesive to the interior surface 12A.

In various embodiments, the connector 14 may be used to adjust the size of the annular gap or generally eliminate the annular gap by bringing the pipe shield 10 into close contact, i.e., a snug fit, with the pipe 30 through the use of an adjustable connector 14, such as a clamp mechanism, etc. It will be further appreciated that in various embodiments, the shield material 12 does not have to fully encircle the pipe, but the connector may provide for connecting the opposing ends of the shielding material 12 without requiring a 360-degree enclosure of the cross-sectional pipe surface.

In various embodiments, the adjustable connector 14 may be embodied as hooks & loops, buckles, straps, etc. In this manner, the shield 10 can be adjusted to encircle conduits of varying dimensions. It will be appreciated that when adjusting the connector 14 to allow the shield 10 to accommodate different size conduits that less than 360-degrees of the conduit may be shielded. However, it may be possible to rotate the shield 10 such that the unshielded area is facing in a direction where it is less likely that someone will contact the unshielded area.

In other embodiments of the adjustable connector 14 may be an end cap similar to the embodiments shown in FIGS. 5A&B and 7A-H, in which the extent to which the shield material 12 extends into the connector 14 may be varied incrementally or continuously from just within the connector 14 to fully inserted as noted above. In this manner, the shield 10 can extend 360 degrees around the conduit over a range of dimensions. The skilled artisan will appreciate that other options of providing an adjustable connector 14 may be employed as well.

Whether or not, the pipe shield 10 requires support to maintain an installed position on the pipe 30, the installer and/or user may or may not desire the annular gap 32. For example, if the pipe 30 is a steam riser that contributes to the heating of a room during the heating season, then the installer or user may want to include an annular gap to support heat transfer and buoyancy driven air flow through the annular gap. Cold, heavier air would be drawn in at the bottom of the pipe shield by the heating and escaping of hot air out of the top of the pipe shield 30 as depicted in FIG. 7A. For cooling, the air flow would be in the opposite direction.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A pipe shield comprising
a shielding material having opposing ends and two surfaces, where the shielding material is sisal rope stacked in one dimension; and
a connector disposed on at least one of the opposing ends of the shielding material and configured to connect the opposing ends of the shielding material to define an interior surface from one of the two surfaces and an exterior surface from the other of the two surfaces, where the connector is a magnetic connector with a cooperating magnet disposed on each of the opposing ends of the shielding material, and where
the pipe shield being configured to wrap around and encircle a pipe to form an annular gap between the pipe and the interior surface of the shielding material when the connector is connected, the connector being adjustable to adjust the annular gap.

2. A method of shielding a pipe comprising:
providing a pipe shield including
    a shielding material having opposing ends and two surfaces, where the shielding material is sisal rope stacked in one dimension, and
    a connector disposed on at least one of the opposing ends of the shielding material and configured to connect the opposing ends of the shielding material to define an interior surface from one of the two surfaces and an exterior surface from the other of the two surfaces, where the connector is a magnetic connector with a cooperating magnet disposed on each of the opposing ends of the shielding material;
wrapping the pipe shield around a pipe;
connecting the connector to encircle the pipe and form an annular gap between the pipe and the interior surface of the shielding material; and
adjusting the connector to adjust the annular gap.

3. The method of claim 2, where the connector includes an adjustable connector.

4. The method of claim 2, where the adjustable connector includes one of a buckle, a hook & loop connector, straps, and an adjustable cap.

5. The method of claim 2, where the connector is molded plastic including a plurality of cooperating magnet connectors.

6. The method of claim 2, where the connector includes first and second caps installed on the opposing ends of the shielding material and including a plurality of cooperating magnet connectors.

7. The method of claim 2, further comprising rotating the shield to adjust the position of the connector.

8. The method of claim 2, further comprising removing the shield from around the pipe.

9. The method of claim 2, where the shield shields less than 360-degrees of the pipe.

10. The method of claim 2, further comprising installing additional pipe shields around the pipe proximate the pipe shield.

11. The method of claim 2, where the cooperating magnet connect at a non-zero angle relative to the opposing ends of the shield material.

\* \* \* \* \*